United States Patent
Zhou et al.

(10) Patent No.: US 11,079,239 B2
(45) Date of Patent: Aug. 3, 2021

(54) METHOD FOR DIRECTLY PLANNING REENTRY TRAJECTORY IN HEIGHT-VELOCITY PROFILE

(71) Applicant: DALIAN UNIVERSITY OF TECHNOLOGY, Dalian (CN)

(72) Inventors: Wenya Zhou, Dalian (CN); Zhentao Nie, Dalian (CN); Feng Yang, Dalian (CN); Kai Liu, Dalian (CN); Guanjun Wang, Dalian (CN); Zhe Li, Dalian (CN); Honggang Xu, Dalian (CN); Feixiong Gao, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 17/031,829

(22) Filed: Sep. 24, 2020

(65) Prior Publication Data

US 2021/0164783 A1   Jun. 3, 2021

Related U.S. Application Data

(63) Continuation of application No. PCT/CN2020/108383, filed on Aug. 11, 2020.

(30) Foreign Application Priority Data

Aug. 29, 2019   (CN) .......................... 201910807220.8

(51) Int. Cl.
*G01C 21/20* (2006.01)
*G05D 1/10* (2006.01)
*B64G 1/62* (2006.01)

(52) U.S. Cl.
CPC .............. *G01C 21/20* (2013.01); *B64G 1/62* (2013.01); *G05D 1/101* (2013.01)

(58) Field of Classification Search
USPC .......................................................... 701/18
See application file for complete search history.

(56) References Cited

U.S. PATENT DOCUMENTS

| | | | | |
|---|---|---|---|---|
| 3,301,508 A | * | 1/1967 | Yamron ................. | B64G 1/361 |
| | | | | 244/3.18 |
| 3,330,503 A | * | 7/1967 | Love ..................... | B64G 1/244 |
| | | | | 244/191 |

(Continued)

FOREIGN PATENT DOCUMENTS

| | | |
|---|---|---|
| CN | 104732106 A | 6/2015 |
| CN | 105205281 A | 12/2015 |

(Continued)

*Primary Examiner* — Tyler D Paige
(74) *Attorney, Agent, or Firm* — Bayramoglu Law Offices LLC

(57) ABSTRACT

A method for directly planning a reentry trajectory in a height-velocity profile includes the following steps: S1, extracting an actual working parameter of an aircraft, setting the maximum value $\dot{Q}_{max}$ of a stagnation point heat flux, the maximum value $q_{max}$ of dynamic pressure, and the maximum value $n_{max}$ of overload according to the mission requirement, and solving the height-velocity boundary of the reentry trajectory, that is, a lower boundary of the reentry trajectory in the height-velocity profile; S2, solving a reentry trajectory of an initial descent stage according to differential equations of reentry motion, and determining a starting point of a trajectory of a gliding stage according to the trajectory of the initial descent stage; and S3, planning a trajectory in the height-velocity profile satisfying terminal constraints based on the lower boundary in the height-velocity profile, and calculating a corresponding bank angle, to obtain the reentry trajectory.

3 Claims, 2 Drawing Sheets

(56) References Cited

U.S. PATENT DOCUMENTS 3,410,502 A * 11/1968 Leadon .................... B64G 1/50
244/164
2021/0086921 A1* 3/2021 Zhou ........................ B64G 1/62

FOREIGN PATENT DOCUMENTS

| CN | 106354152 A | 1/2017 |
| CN | 107941087 A | 4/2018 |
| CN | 107992074 A | 5/2018 |
| CN | 110471450 A | 11/2019 |
| RU | 2011135313 A | 3/2013 |

* cited by examiner

METHOD FOR DIRECTLY PLANNING REENTRY TRAJECTORY IN HEIGHT-VELOCITY PROFILE

CROSS REFERENCE TO THE RELATED APPLICATIONS

This application is the continuation application of International Application No. PCT/CN2020/108383, filed on Aug. 11, 2020, which is based upon and claims priority to Chinese Patent Application No. 201910807220.8, filed on Aug. 29, 2019, the entire contents of which are incorporated herein by reference.

TECHNICAL FIELD

The present invention belongs to the field of aerospace technologies, and more particularly, relates to a method for directly planning a reentry trajectory in a height-velocity profile.

BACKGROUND

Lift reentry spacecrafts have the advantages of fast speed, long range, and high maneuverability. Thus, such reentry spacecraft can achieve military missions such as rapid global attack or delivery of supplies. During reentry flight, these aircraft exhibit dynamic characteristics such as strong non-linearity, strong coupling, and fast dynamic changes. Additionally, the reentry flight needs to satisfy process constraints with respect to stagnation point heat flux, dynamic pressure, and overload, and terminal constraints with respect to velocity, position, and heading error angle. As a result, it is extremely difficult to design a reentry trajectory.

Commonly used differential equations for describing reentry motion are as follows (ignoring the rotation of the earth):

$$\frac{dr}{dt} = V\sin\gamma; \quad (1)$$

$$\frac{d\theta}{dt} = \frac{V\cos\gamma\cos\psi}{r\cos\phi}; \quad (2)$$

$$\frac{d\phi}{dt} = \frac{V\cos\gamma\sin\psi}{r}; \quad (3)$$

$$\frac{dV}{dt} = -\frac{D}{m} - g\sin\gamma; \quad (4)$$

$$\frac{d\gamma}{dt} = \frac{1}{V}\left[\frac{L}{m}\cos\sigma - \left(g - \frac{V^2}{r}\right)\cos\gamma\right]; \quad (5)$$

$$\frac{d\psi}{dt} = \frac{1}{V}\left[\frac{L}{m\cos\gamma}\sin\sigma - \frac{V^2}{r}\cos\gamma\cos\psi\tan\phi\right]; \quad (6)$$

wherein r represents the geocentric distance, $\theta$ represents longitude, $\phi$ represents latitude, V represents a velocity, $\gamma$ represents a flight path angle, $\psi$ represents a heading angle, m represents the mass of the aircraft, g represents the gravitational acceleration, L represents lift, D represents drag, and $\sigma$ represents a bank angle;

$$D = \frac{1}{2}\rho S_{ref} C_D V^2; \quad (7)$$

$$L = \frac{1}{2}\rho S_{ref} C_L V^2; \quad (8)$$

wherein $\rho$ represents atmospheric density; $S_{ref}$ represents the aerodynamic reference area of the aircraft; $C_L$ and $C_D$ are lift and drag coefficients, respectively (the relationship between the lift coefficient, the drag coefficient, the angle of attack $\alpha$, and the velocity V is generally derived from wind tunnel tests).

In addition to the aforementioned six motion state variables, the equations further include two control variables, i.e., bank angle $\sigma$ and angle of attack $\alpha$. The control effect of the angle of attack $\alpha$ is implied in the drag coefficient $C_D$ and the lift coefficient $C_L$.

The atmospheric density is modeled in an exponential form, and specifically expressed as follows:

$$\rho = \rho_0 e^{-h/\beta}$$

wherein $\rho_0$ is the atmospheric density at sea level; h represents an altitude; and $\beta$ is the atmospheric constant.

The gravity model is expressed as follows:

$$g = \frac{R_0^2}{r^2} g_0; \quad (10)$$

wherein $R_0$ is the radius of the earth, the altitude $h = r - R_0$, and $g_o$ is the gravitational acceleration at sea level.

Process constraints and terminal constraints should be considered in the design of the reentry trajectory. The process constraints include constraints of the stagnation point heat flux, dynamic pressure constraints, and overload constraints, which are respectively expressed as follows:

$$\dot{Q} = k_Q \rho^{0.5} V^{3.15} \leq \dot{Q}_{max}; \quad (11)$$

$$q = \frac{1}{2}\rho V^2 \leq q_{max}; \quad (12)$$

$$n = \frac{\sqrt{L^2 + D^2}}{mg} \leq n_{max}; \quad (13)$$

wherein the boundaries of the three process constraints are equations with respect to the geocentric distance r and the flight velocity V.

The terminal constraints include the flight velocity V satisfying a terminal velocity requirement, and the geocentric distance, the range-to-go, and the heading error angle being within a certain range, which are expressed as follows:

$$|r_f - r_{TAEM}| < \Delta r \quad (14);$$

$$V_f = V_{TAEM} \quad (15);$$

$$|\Delta\psi_f| < \Delta\psi_{TAEM} \quad (16);$$

$$S_f < S_{TAEM} \quad (17);$$

wherein variables with subscript "f" represent values at an ending point of the reentry trajectory of the spacecraft, and variables with subscript "TEAM" represents a state when a terminal area energy management stage is entered. S represents the range-to-go. The plane determined by the location of the aircraft, a target point, and the center of the earth is an instantaneous target plane, and the range-to-go refers to the length of a great arc projected from a current position to the target point onto the surface of the earth in the instantaneous target plane. The longitude $\theta_T$ and the latitude $\phi_T$ of the target point are known.

$$S=\cos^{-1}(\sin\phi\sin\phi_T+\cos\phi\cos\phi_T\cos(\theta-\theta_T))\times R_0 \quad (18);$$

$\Delta\psi=\psi_{LOS}-\psi$ represents a heading error angle, which is an angle between the Line of Sight (LOS) of the target point and the current heading; wherein $\psi_{LOS}$ represents the azimuth of the LOS from the current position of the aircraft to the target point (taking true north as a reference, the clockwise direction as positive), and is expressed as:

$$\psi_{LOS}=\tan^{-1}\left[\frac{\sin(\theta_T-\theta)}{\cos\phi\tan\phi_T-\sin\phi\cos(\theta_T-\theta)}\right]. \quad (19)$$

The design of the reentry trajectory is to design two control variables, including the angle of attack $\alpha$ and the bank angle $\sigma$, to make the motion trajectory of the aircraft satisfy the process constraints and the terminal constraints. The angle of attack $\alpha$ may be designed offline and loaded into an airborne computer in advance. The bank angle $\sigma$ is generally generated online in real time based on an actual situation of a reentry mission.

At present, the existing technology is a trajectory design method and a flight path angle profile planning method based on "Quasi-Equilibrium Gliding Condition (QEGC)".

In the "Quasi-Equilibrium Gliding Condition" method, the flight path angle $\gamma$ and its changing rate $\dot{\gamma}$ of the entire gliding stage are assumed to be always zero, then the differential equation (5) is transformed into an algebraic equation as follows:

$$L\cos\sigma-\left(g-\frac{V^2}{r}\right)=0. \quad (20)$$

The equation (20) describes the relationship between the two control variables including the angle of attack $\alpha$ (implied in the lift L) and the bank angle $\sigma$, and the two state variables including the geocentric distance r and the flight velocity V, which is also referred to as the Quasi-Equilibrium Gliding Condition. Since the angle of attack $\alpha$ is designed offline in advance, the relationship between the bank angle $\sigma$, the geocentric distance r, and the flight velocity V is given by the equation (20). Therefore, the boundary of the bank angle $\sigma$ corresponding to the process constraints and the Quasi-Equilibrium Gliding Condition can be solved through the above relationship. A control variable profile is planned in a control variable boundary to achieve the purpose of designing the reentry trajectory.

Since the flight path angle and its changing rate are ignored in the Quasi-Equilibrium Gliding Condition method, the designed reentry trajectory may not satisfy the process constraints, which reduces the reliability of the reentry trajectory. On this basis, a reentry trajectory design method based on flight path angle profile planning is proposed.

When the angle of attack $\alpha$ is designed offline in advance and the maximum value of the process constraint is known, the process constraint can be transformed into a function expression of the geocentric distance r with respect to the velocity V, that is, a process constraint curve may be drawn in an r-V profile. The lower boundary of the flight path angle is obtained by finding a tangent between the ending point of the initial descent stage and the process constraint as well as a tangent between a terminal constraint point and the process constraint in the r-V profile. Based on the lower boundary of the flight path angle, a flight path angle increment satisfying the constraint requirements is planned, height-velocity parameters can be further obtained through integration to solve the bank angle $\sigma$, so as to achieve the purpose of designing the reentry trajectory.

Although the influences of the flight path angle and its changing rate are considered in the above-mentioned method, a curve in the r-V profile corresponding to a current flight path angle profile needs to be solved through numerical integration in the process of solving the bank angle $\sigma$. As a result, the process of transformation from the r-V profile to the flight path angle profile and then from the flight path angle profile to the r-V profile is repeated in the solving process, which reduces the efficiency of trajectory planning.

SUMMARY

In view of the above-mentioned technical problem that in the process of solving the bank angle $\sigma$, the efficiency of trajectory planning is reduced due to repeating the process of transformation from the r-V profile to the flight path angle profile and then from the flight path angle profile to the r-V profile, a method for directly planning a reentry trajectory in a height-velocity profile is provided, which not only improves the accuracy of the reentry trajectory, but also has high reliability and high speed, and is conductive to the application in reentry aerospace engineering.

The present invention adopts the following technical solutions.

A method for directly planning a reentry trajectory in a height-velocity profile includes the following steps:

S1, extracting an actual working parameter of an aircraft, setting the maximum value $\dot{Q}_{max}$ of a stagnation point heat flux, the maximum value $q_{max}$ of dynamic pressure, and the maximum value $n_{max}$ of overload according to the mission requirement, and solving the height-velocity boundary of the reentry trajectory, that is, a lower boundary of the reentry trajectory in the height-velocity profile;

S2, solving a reentry trajectory of an initial descent stage according to differential equations of reentry motion, and determining a starting point of a trajectory of a gliding stage according to the trajectory of the initial descent stage; and S3, planning a trajectory in the height-velocity profile based on the lower boundary in the height-velocity profile, wherein the trajectory in the height-velocity profile satisfies terminal constraints, and calculating a corresponding bank angle, to obtain the reentry trajectory.

Further, step S1 specifically includes the following steps:

S11, extracting the actual working parameter of the aircraft, and setting the maximum value $\dot{Q}_{max}$ of the stagnation point heat flux, the maximum value $q_{max}$ of the dynamic pressure, and the maximum value $n_{max}$ of the overload according to the mission requirement;

S12, calculating process constraints of the reentry trajectory according to the maximum value $\dot{Q}_{max}$ of the stagnation point heat flux, the maximum value $q_{max}$ of the dynamic pressure, and the maximum value $n_{max}$ of the overload; and S13, drawing the process constraints of the reentry trajectory in the height-velocity profile, to obtain the height-velocity boundary of the reentry trajectory, that is, the lower boundary $h_{min}(V)$ of the reentry trajectory.

Further, step S2 specifically includes the following steps:

S21, solving a flight state variable of the initial descent stage according to the following differential equations of reentry motion, and drawing the reentry trajectory of the initial descent stage in the height-velocity profile;

$$\frac{dr}{dt} = V\sin\gamma;$$

$$\frac{d\theta}{dt} = \frac{-V\cos\gamma\cos\psi}{r\cos\phi};$$

$$\frac{d\phi}{dt} = \frac{V\cos\gamma\sin\psi}{r};$$

$$\frac{dV}{dt} = -\frac{D}{m} - g\sin\gamma;$$

$$\frac{d\gamma}{dt} = \frac{1}{V}\left[\frac{L}{m}\cos\sigma - \left(g - \frac{V^2}{r}\right)\cos\gamma\right];$$

$$\frac{d\psi}{dt} = \frac{1}{V}\left[\frac{L}{m\cos\gamma}\sin\sigma - \frac{V^2}{r}\cos\gamma\cos\psi\tan\phi\right];$$

wherein r represents the geocentric distance, $\theta$ represents a longitude, $\phi$ represents a latitude, V represents a velocity, $\gamma$ represents a flight path angle, $\psi$ represents a heading angle, m represents the mass of the aircraft, g represents the gravitational acceleration, L represents a lift, D represents a drag, and $\sigma$ represents a bank angle; and S22, determining an ending point of the trajectory of the initial descent stage according to the formula $$\left|\frac{dr}{dV}\right| < \delta,$$

that is, the starting point of the trajectory of the gliding stage, wherein $\delta$ is a small variable selected according to the mission requirement.

Further, step S3 specifically includes the following steps:

S31, setting two initial values $\Delta h_1(V)$ and $\Delta h_2(V)$ of a height increment, wherein the form of $\Delta h(V)$ is not unique, and the value of $\Delta h(V)$ is always greater than zero; and after a summation of $\Delta h(V)$ and the lower boundary, two endpoints of the obtained trajectory are located at the starting point of the gliding stage and a point determined by terminal height-velocity constraints;

S32, calculating height values corresponding to different velocity conditions according to the following formula:

$$h(V) = h_{min}(V) + \Delta h(V);$$

S33, calculating the corresponding flight path angle according to the following formula:

$$\gamma = \sin^{-1}\left(\frac{-D \times dr}{mVdV + mgdr}\right);$$

S34, calculating the corresponding bank angle according to following the formula:

$$|\sigma(V)| = \cos^{-1}\left[\left(\frac{d\gamma V^2 \sin\gamma}{dr} + g\cos\gamma - \frac{V^2\cos\gamma}{r}\right)\frac{m}{L}\right];$$

S35, satisfying the requirements of lateral trajectory control by changing a positive or negative value using a bank angle reversal strategy;

S36, calculating a range S between an endpoint of the design and the starting point of the gliding stage according to the following formula:

$$S = \cos^{-1}(\sin\phi\sin\phi_T + \cos\phi\cos\phi_T\cos(\theta - \theta_T)) \times R_0;$$

wherein $\phi_T$ represents a latitude of a target point, $\phi_T$ represents a longitude of the target point, and $R_0$ represents the radius of the earth;

S37, determining whether the current trajectory satisfies an error requirement, and if not, updating the height increment $\Delta h$ according to the following formula:

$$\Delta h_n = \Delta h_{n-1} - \frac{(\Delta h_{n-1} - \Delta h_{n-2})(S_{n-1} - S_{if})}{S_{n-1} - S_{n-2}};$$

wherein the subscript n(n>2) represents the result obtained from the $n^{th}$ calculation, and $S_{if}$ represents a range-to-go between the starting point of the gliding stage and the target point; and S38, repeating step S32 to step S36 until the error requirement is satisfied.

Further, step S12 specifically includes the following steps:

calculating the process constraints of the reentry trajectory according to the maximum value $\dot{Q}_{max}$ of the stagnation point heat flux, the maximum value $q_{max}$ of the dynamic pressure, and the maximum value $n_{max}$ of the overload, wherein the specific expressions thereof are as follows:

solving a corresponding flight velocity $V_Q$ and a geocentric distance $r_Q$ when the stagnation point heat flux reaches the maximum value according to the following formula:

$$\dot{Q} = k_Q \rho^{0.5} V^{3.15} \leq \dot{Q}_{max};$$

wherein $k_Q$ represents a parameter of the aircraft, and $\rho$ represents atmospheric density;

solving a corresponding flight velocity $V_q$ and a geocentric distance $r_q$ when the dynamic pressure reaches the maximum value according to the following formula:

$$q = \frac{1}{2}\rho V^2 \leq q_{max};$$

solving a corresponding flight velocity $V_n$ and a geocentric distance $r_n$ when the overload reaches the maximum value according to the following formula:

$$n = \frac{\sqrt{L^2 + D^2}}{mg} \leq n_{max};$$

wherein L represents a lift, and D represents a drag; and through the calculation, the process constraints of the reentry trajectory including constraints of the stagnation point heat flux, dynamic pressure constraints, and overload constraints are obtained.

Compared with the prior art, by adopting the method for directly planning a reentry trajectory in a height-velocity profile in the present invention, the reentry trajectory can be accurately planned to avoid the risk that it may not satisfy process constraints because of not considering the flight path angle and the changing rate thereof, which improves the reliability of the reentry trajectory and has optimal calculation speed and accuracy.

BRIEF DESCRIPTION OF THE DRAWINGS

To illustrate the technical solutions according to the embodiments of the present invention or in the prior art more clearly, the drawings for describing the embodiments or the prior art are introduced briefly below. The drawings in the following description are only some embodiments of the present invention. Those having ordinary skill in the art can obtain other drawings according to the drawings without creative efforts.

DETAILED DESCRIPTION OF THE EMBODIMENTS

To make those skilled in the art better understand the technical solution of the present invention, the technical solution in the embodiments of the present invention will be clearly and fully described below with reference to the drawings in the embodiments of the present invention. Obviously, the described embodiments are only a part rather than all of the embodiments of the present invention. All other embodiments derived by those having ordinary skill in the art based on the embodiments of the present invention without creative efforts should fall within the scope of protection of the present invention.

It should be noted that, the terms "first", "second", and the like in the specification, claims, and the drawings of the present invention are used to distinguish similar objects, rather than to necessarily describe a particular order or sequence. It should be understood that, such data used can be interchanged under appropriate circumstances, so that the embodiments of the present invention described herein can be implemented in an order other than the content illustrated or described herein. In addition, the terms "comprise/include" and "have" as well as their any variations are intended to cover non-exclusive inclusion, for example, a process, method, system, product or device including a series of steps or units does not need to be limited to these steps or units clearly listed, but may include other steps or units not clearly listed or inherent to the process, method, system, product or device.

Figure 1:
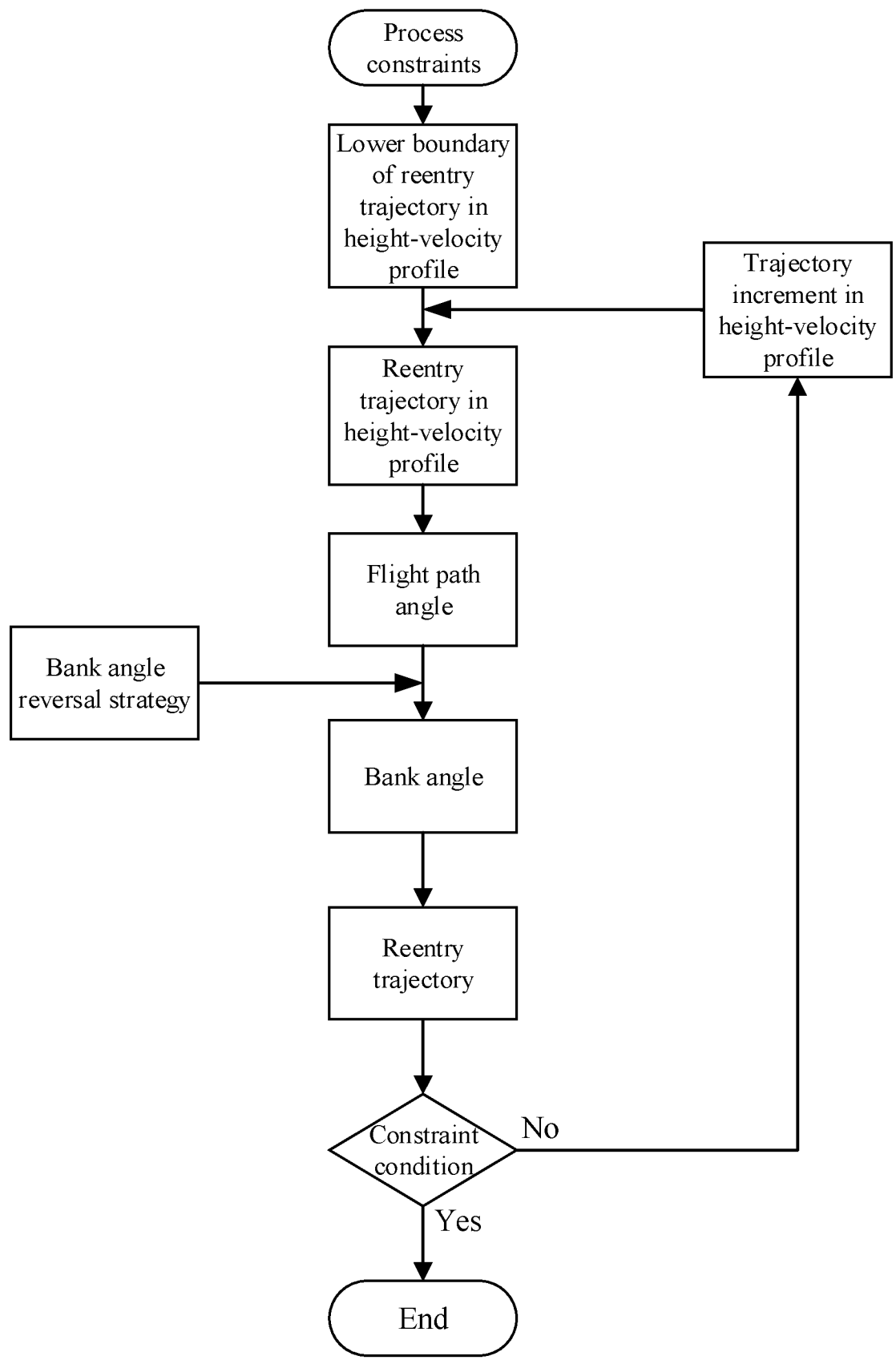
FIG. 1 is a flow chart showing the calculation of the method for directly planning the reentry trajectory in the height-velocity profile of the present invention.
Figure 2:
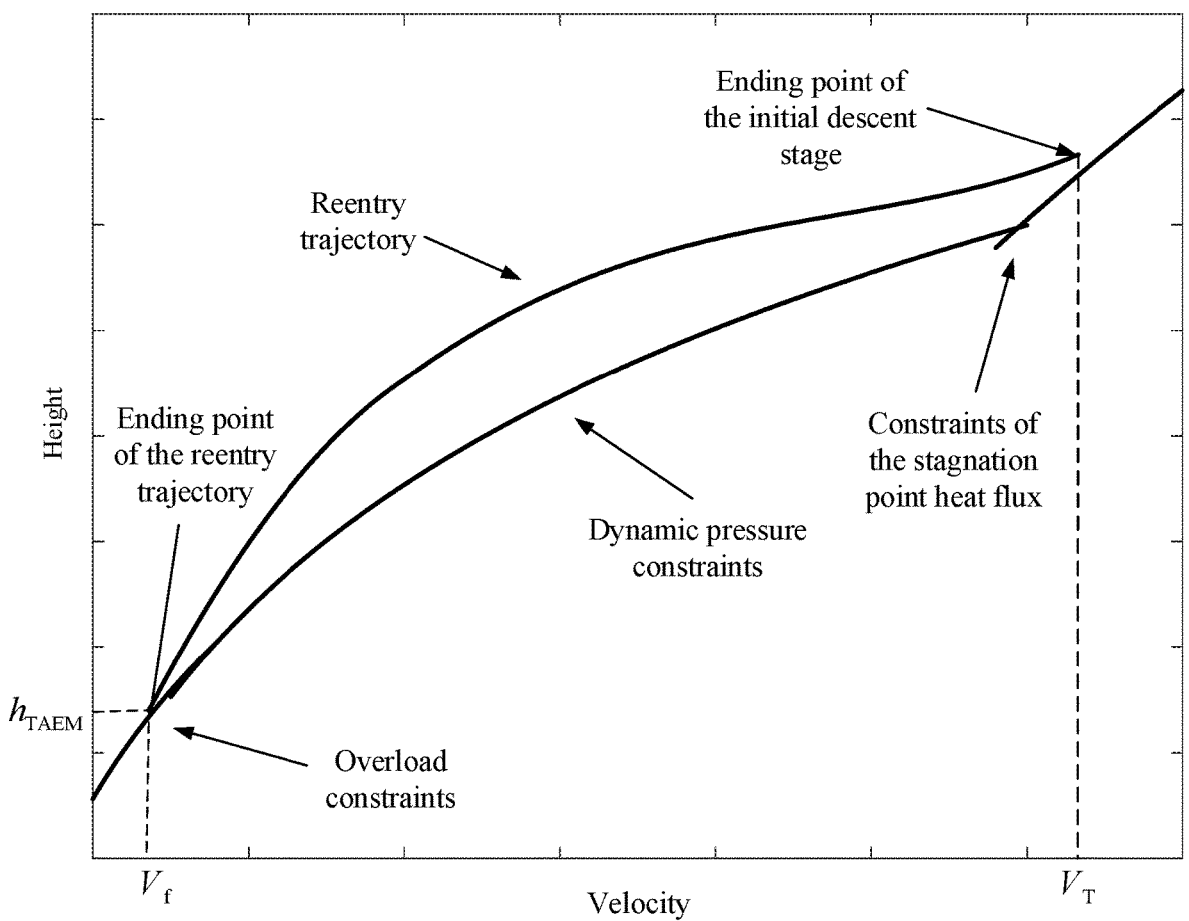
FIG. 2 is a schematic diagram showing the trajectory obtained by planning in the height-velocity profile of the present invention.

As shown in FIG. 1, the present invention provides a method for directly planning a reentry trajectory in a height-velocity profile, including the following steps:

S1, the actual working parameter of an aircraft are extracted, the maximum value $\dot{Q}_{max}$ of the stagnation point heat flux, the maximum value $q_{max}$ of the dynamic pressure, and the maximum value $n_{max}$ of the overload are set according to a mission requirement, and the lower boundary $h_{min}(V)$ of the reentry trajectory in the height-velocity profile is solved, which specifically includes:

Step S11, the actual working parameter of the aircraft are extracted, and the maximum value $\dot{Q}_{max}$ of the stagnation point heat flux, the maximum value $q_{max}$ of the dynamic pressure, and the maximum value $n_{max}$ of the overload are set according to the mission requirement;

Step S12, process constraints of the reentry trajectory are calculated according to the maximum value $\dot{Q}_{max}$ of the stagnation point heat flux, the maximum value $q_{max}$ of the dynamic pressure, and the maximum value $n_{max}$ of the overload, wherein the specific expressions thereof are as follows.

The corresponding flight velocity $V_Q$ and the geocentric distance $r_Q$ when the stagnation point heat flux reaches the maximum value are solved according to the following formula:

$$\dot{Q} = k_Q \rho^{0.5} V^{3.15} \leq \dot{Q}_{max};$$

wherein $k_Q$ represents a parameter of the aircraft, and $\rho$ represents atmospheric density.

The corresponding flight velocity $V_q$ and the geocentric distance $r_q$ when the dynamic pressure reaches the maximum value are solved according to the following formula:

$$q = \frac{1}{2}\rho V^2 \leq q_{max}.$$

The corresponding flight velocity $V_n$ and the geocentric distance $r_n$ when the overload reaches the maximum value are solved according to the following formula:

$$n = \frac{\sqrt{L^2 + D^2}}{mg} \leq n_{max};$$

wherein L represents a lift, and D represents a drag.

Through the calculation, the process constraints of the reentry trajectory including constraints of the stagnation point heat flux, dynamic pressure constraints, and overload constraints are obtained.

Step S13, the process constraints of the reentry trajectory are drawn in the height-velocity profile, to obtain a height-velocity boundary of the reentry trajectory, that is, the lower boundary of the reentry trajectory.

S2, a reentry trajectory of an initial descent stage is solved according to differential equations of reentry motion, and a starting point of a trajectory of a gliding stage is determined according to the trajectory of the initial descent stage, which specifically includes:

Step S21, a flight state variable of the initial descent stage is solved according to the following differential equations of reentry motion, and the reentry trajectory of the initial descent stage is drawn in the height-velocity profile:

$$\frac{dr}{dt} = V\sin\gamma;$$

$$\frac{d\theta}{dt} = \frac{V\cos\gamma\cos\psi}{r\cos\phi};$$

$$\frac{d\phi}{dt} = \frac{V\cos\gamma\sin\psi}{r};$$

$$\frac{dV}{dt} = -\frac{D}{m} - g\sin\gamma;$$

$$\frac{d\gamma}{dt} = \frac{1}{V}\left[\frac{L}{m}\cos\sigma - \left(g - \frac{V^2}{r}\right)\cos\gamma\right];$$

$$\frac{d\psi}{dt} = \frac{1}{V}\left[\frac{L}{m\cos\gamma}\sin\sigma - \frac{V^2}{r}\cos\gamma\cos\psi\tan\phi\right];$$

wherein r represents the geocentric distance, $\theta$ represents a longitude, $\phi$ represents a latitude, V represents a velocity, $\gamma$ represents a flight path angle, $\psi$ represents a heading angle, m represents the mass of the aircraft, g represents the gravitational acceleration, L represents the lift, D represents the drag, and a represents a bank angle. A series of points (V, r) in the height-velocity profile can be calculated through the above differential equations.

S22, an ending point of the trajectory of the initial descent stage is determined according to the formula $$\left|\frac{dr}{dV}\right| < \delta,$$

wherein $\delta$ is a small variable preset according to the mission requirement.

S3, the reentry trajectory h(V) in the height-velocity profile satisfying terminal constraints is planned based on the lower boundary $h_{min}(V)$ of the trajectory in the height-velocity profile, and the corresponding bank angle is calculated, to obtain a complete reentry trajectory, which specifically includes:

Step S31, two initial values $\Delta h_1(V)$ and $\Delta h_2(V)$ of the height increment $\Delta h(V)$ are set.

Step S32, height values corresponding to different velocity conditions are calculated according to the following formula:

$$h(V) = h_{min}(V) + \Delta h(V).$$

Step S33, the corresponding flight path angle is calculated according to the following formula:

$$\gamma = \sin^{-1}\left(\frac{-D \times dr}{mVdV + mgdr}\right).$$

Step S34, the corresponding bank angle is calculated according to the following formula:

$$|\sigma(V)| = \cos^{-1}\left[\left(\frac{d\gamma V^2 \sin\gamma}{dr} + g\cos\gamma - \frac{V^2 \cos\gamma}{r}\right)\frac{m}{L}\right].$$

Step S35, the requirements of lateral trajectory control are satisfied by changing a positive or negative value of the bank angle using a bank angle reversal strategy.

Step S36, the range S between an endpoint of the design and the starting point of the gliding stage is calculated according to the following formula:

$$S = \cos^{-1}(\sin\phi \sin\phi_T + \cos\phi \cos\phi_T \cos(\theta - \theta_T)) \times R_0;$$

wherein $\phi_T$ represents a latitude of a target point, $\theta_T$ represents a longitude of the target point, and $R_0$ represents the radius of the earth.

Step S37, it is determined that whether the requirement is satisfied, and if not, the height increment $\Delta h$ is updated according to the following formula:

$$\Delta h_n = \Delta h_{n-1} - \frac{(\Delta h_{n-1} - \Delta h_{n-2})(S_{n-1} - S_{if})}{S_{n-1} - S_{n-2}}.$$

Step S38, step S32 to step S36 are repeated until the error requirement is satisfied.

In the present invention, the error requirements are set according to mission situations. Generally, the terminal constraints include the flight velocity V satisfying the terminal velocity requirement, and the geocentric distance, the range-to-go, and the heading error angle being within a certain range, which are expressed as follows:

$$|r_f - r_{TAEM}| < \Delta r;$$

$$V_f = V_{TAEM};$$

$$|\Delta \psi_f| < \Delta \psi_{TAEM};$$

$$S_f < S_{TAEM};$$

wherein variables with subscript "f" represent values at the ending point of the reentry trajectory of the spacecraft; and variables with subscript "TEAM" represent the corresponding states when a terminal area energy management stage is entered. S represents the range-to-go. The plane determined by the location of the aircraft, the target point, and the center of the earth is an instantaneous target plane, and the range-to-go refers to the length of a great arc projected from a current position to the target point onto the surface of the earth in the instantaneous target plane. The longitude $\theta_T$ and the latitude $\phi_T$ of the target point are known.

$$S = \cos^{-1}(\sin\phi \sin\phi_T + \cos\phi \cos\phi_T \cos(\theta - \theta_T)) \times R_0.$$

$\Delta \psi = \psi_{LOS} - \psi$ represents a heading error angle, which is an angle between the Line of Sight (LOS) of the target point and the current heading; wherein $\psi_{LOS}$ represents the azimuth of the LOS from the current position of the aircraft to the target point (taking true north as a reference, the clockwise direction as positive), and is expressed as:

$$\psi_{LOS} = \tan^{-1}\left[\frac{\sin(\theta_T - \theta)}{\cos\phi\tan\phi_T - \sin\phi\cos(\theta_T - \theta)}\right].$$

According to the present invention, the reentry trajectory can be accurately planned to avoid the risk that the reentry trajectory may not satisfy the process constraints due to ignoring the flight path angle and the changing rate thereof in the prior art, which improves the reliability of the reentry trajectory.

Finally, it should be noted that the foregoing embodiments are intended only to describe the technical solutions of the present invention, rather than to limit the present invention. It should be understood by those having ordinary skill in the art that although the present invention has been described in detail with reference to the foregoing embodiments, modifications can be made to the technical solutions described in the foregoing embodiments, or equivalent replacements can be made to some or all of the technical features. Such modifications or replacements do not cause the essence of the corresponding technical solutions to depart from the scope of the technical solutions of the embodiments of the present invention.

What is claimed is:

1. A method for directly planning a reentry trajectory of a spacecraft into Earth's atmosphere in a height-velocity profile, comprising the following steps:

S1, extracting an actual working parameter of the spacecraft, setting a maximum value $\dot{Q}_{max}$ of a stagnation point heat flux, a maximum value $q_{max}$ of a dynamic pressure, and a maximum value $n_{max}$ of an overload according to a mission requirement, and solving a height-velocity boundary of the reentry trajectory for the spacecraft, wherein the height-velocity boundary of the reentry trajectory is a lower boundary of the reentry trajectory in the height-velocity profile;

S2, solving a reentry trajectory of an initial descent stage according to differential equations of reentry motion, and determining a starting point of a trajectory of a gliding stage according to the reentry trajectory of the initial descent stage; and S3, planning a trajectory in the height-velocity profile based on the lower boundary in the height-velocity profile, wherein the trajectory in the height-velocity profile satisfies terminal constraints, and calculating a bank angle corresponding to the trajectory in the height-velocity profile, to obtain the reentry trajectory;

step S2 specifically comprises the following steps:

S21, solving a flight state variable of the initial descent stage according to the differential equations of the reentry motion, and drawing the reentry trajectory of the initial descent stage in the height-velocity profile, wherein the differential equations of the reentry motion are expressed as follows:

$$\frac{dr}{dt} = V\sin\gamma;$$

$$\frac{d\theta}{dt} = \frac{V\cos\gamma\cos\psi}{r\cos\phi};$$

$$\frac{d\phi}{dt} = \frac{V\cos\gamma\sin\psi}{r};$$

$$\frac{dV}{dt} = -\frac{D}{m} - g\sin\gamma;$$

$$\frac{d\gamma}{dt} = \frac{1}{V}\left[\frac{L}{m}\cos\sigma - \left(g - \frac{V^2}{r}\right)\cos\gamma\right];$$

$$\frac{d\psi}{dt} = \frac{1}{V}\left[\frac{L}{m\cos\gamma}\sin\sigma - \frac{V^2}{r}\cos\gamma\cos\psi\tan\phi\right];$$

wherein r represents a geocentric distance, θ represents a longitude, φ represents a latitude, V represents a velocity, γ represents a flight path angle, ψ represents a heading angle, m represents a mass of the spacecraft, g represents a gravitational acceleration, L represents a lift, D represents a drag, and σ represents the bank angle;

S22, determining an ending point of the reentry trajectory of the initial descent stage according to formula $$\left|\frac{dr}{dV}\right| < \delta,$$

wherein the ending point of the reentry trajectory of the initial descent stage is the starting point of the trajectory of the gliding stage, and is a small variable selected according to the mission requirement;

step S3 specifically comprises the following steps:

S31 setting two initial values $\Delta h_1(V)$ and $\Delta h_2(V)$ of a height increment $\Delta h(V)$, wherein a form of the height increment $\Delta h(V)$ is not unique, and a value of the height increment $\Delta h(V)$ is greater than zero; and after a summation of the height increment $\Delta h(V)$ and the lower boundary $h_{min}(V)$ of the reentry trajectory, two endpoints of the reentry trajectory are located at the starting point of the trajectory of the gliding stage and a point determined by the terminal constraints;

S32, calculating height values corresponding to different velocity conditions according to the following formula:

$$h(V) = h_{min}(V) + \Delta h(V);$$

S33, calculating the flight path angle corresponding to the reentry trajectory according to the following formula:

$$\gamma = \sin^{-1}\left(\frac{-D \times dr}{mVdV + mgdr}\right);$$

S34, calculating the bank angle according to following the formula:

$$|\sigma(V)| = \cos^{-1}\left[\left(\frac{d\gamma V^2\sin\gamma}{dr} + g\cos\gamma - \frac{V^2\cos\gamma}{r}\right)\frac{m}{L}\right];$$

S35, satisfying requirements of lateral trajectory control by changing a positive value or a negative value of the bank angle using a bank angle reversal strategy;

S36, calculating a range S between an endpoint and the starting point of the gliding stage according to the following formula:

$$S = \cos^{-1}(\sin\phi\sin\phi_T + \cos\phi\cos\phi_T\cos(\theta - \theta_T)) \times R_0;$$

wherein $\phi_T$ represents a latitude of a target point, $\theta_T$ represents a longitude of the target point, and $R_0$ represents a radius of the earth;

S37, determining whether the reentry trajectory satisfies an error requirement, and if the reentry trajectory does not satisfy the error requirement, updating the height increment Δh according to the following formula:

$$\Delta h_n = \Delta h_{n-1} - \frac{(\Delta h_{n-1} - \Delta h_{n-2})(S_{n-1} - S_{if})}{S_{n-1} - S_{n-2}};$$

wherein a subscript n represents a result obtained from an $n^{th}$ calculation and is greater than 2, and $S_{if}$ represents a range-to-go between the starting point of the gliding stage and the target point; and S38, repeating step S32 to step S36 until the error requirement is satisfied;

wherein, in steps S1-S3, the spacecraft flight path angle γ and the changing rate dγ/dt into the Earth's atmosphere are used directly in planning a reentry trajectory in the height-velocity profile of the spacecraft in real-time by computing the bank angle σ in real-time.

2. The method for directly planning the reentry trajectory of a spacecraft into Earth's atmosphere in the height-velocity profile according to claim 1, wherein, step S1 specifically comprises the following steps:

S11, extracting the actual working parameter of the spacecraft, and setting the maximum value $\dot{Q}_{max}$ of the stagnation point heat flux, the maximum value $q_{max}$ of the dynamic pressure, and the maximum value $n_{max}$ of the overload according to the mission requirement;

S12, calculating process constraints of the reentry trajectory according to the maximum value $\dot{Q}_{max}$ of the stagnation point heat flux, the maximum value $q_{max}$ of the dynamic pressure, and the maxim urn value $n_{max}$ of the overload; and S13, drawing the process constraints of the reentry trajectory in the height-velocity profile, to obtain the height-velocity boundary of the reentry trajectory, wherein the height-velocity boundary of the reentry trajectory is the lower boundary $h_{min}(V)$ of the reentry trajectory.

3. The method for directly planning the reentry trajectory of a spacecraft into Earth's atmosphere in the height-velocity profile according to claim 2, wherein, step S12 specifically comprises the following steps:

calculating the process constraints of the reentry trajectory according to the maximum value $\dot{Q}_{max}$ of the stagnation point heat flux, the maximum value $q_{max}$ of the dynamic pressure, and the maximum value $n_{max}$ of the overload, wherein specific expressions are as follows:

solving a flight velocity $V_Q$ and a geocentric distance $r_Q$ when the stagnation point heat flux reaches the maximum value $\dot{Q}_{max}$ according to the following formula:

$$\dot{Q}=k_Q\rho^{0.5}V^{3.15}\le\dot{Q}_{max};$$

wherein $k_Q$ represents a parameter of the spacecraft, and $\rho$ represents an atmospheric density;

solving a flight velocity $V_q$ and a geocentric distance $r_q$ when the dynamic pressure reaches the maximum value $q_{max}$ according to the following formula:

$$q=\frac{1}{2}\rho V^2\le q_{max};$$

solving a flight velocity $V_n$ and a geocentric distance $r_n$ when the overload reaches the maximum value $n_{max}$ according to the following formula:

$$n=\frac{\sqrt{L^2+D^2}}{mg}\le n_{max};$$

wherein L represents the lift; and D represents the drag; and through a calculation, the process constraints of the reentry trajectory comprising constraints of the stagnation point heat flux, dynamic pressure constraints, and overload constraints are obtained.

* * * * *